United States Patent

Smith

[15] 3,643,872
[45] Feb. 22, 1972

[54] DEVICE FOR SPREADING GRANULAR OR POWDERY MATERIAL

[72] Inventor: Elwood Lee Smith, Elm City, N.C.
[73] Assignee: The Lely Corporation, Wilson, N.C.
[22] Filed: Oct. 20, 1969
[21] Appl. No.: 867,733

[52] U.S. Cl..............................239/655, 222/178, 222/301, 239/664
[51] Int. Cl..........................................A01c 15/04
[58] Field of Search...............................239/661, 664–668, 239/655; 222/299–301, 173, 410, 485, 176, 155, 177, 154, 156

[56] References Cited

UNITED STATES PATENTS

| | | | |
|---|---|---|---|
| 3,273,898 | 9/1966 | Van Der Lely et al. | 239/666 |
| 3,473,739 | 10/1969 | Singleton | 239/664 |
| 2,754,126 | 7/1956 | Aune | 239/666 |
| 3,329,322 | 7/1967 | Herd | 239/664 |
| 2,586,492 | 2/1952 | Ulrich | 239/664 |
| 2,528,662 | 11/1950 | Miller | 222/156 X |

Primary Examiner—Samuel F. Coleman
Assistant Examiner—Larry H. Martin
Attorney—Mason, Mason & Albright

[57] ABSTRACT

A spreading device including a hopper, a rotatable spreader disc and a hood beneath the hopper, the hood surrounding the disc. Within the hood, turnable feed or distributor rings with outlet ports are positioned between the spreader and the hopper. The hood has a plurality of ejection openings arranged around the disc to receive granular or powdery material which is first passed through the ports in the distributor rings and then propelled by the disc. Outlets in distributor arms are located downstream from the openings at varying distances from the disc. Air inlets are provided in the hood adjacent the spreader disc so that air can be drawn in and expelled by the rotating disc, carrying the granular or powdery material being spread. An internal web of guide segments within the hood divide the openings from one another and assist to dispense even amounts of material received from the hopper. Baffles are located near the outlets to guide ejected material towards the ground.

19 Claims, 4 Drawing Figures

INVENTOR
ELWOOD L. SMITH

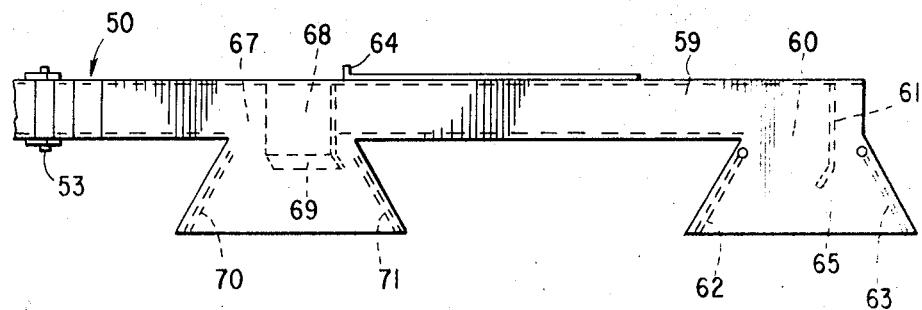
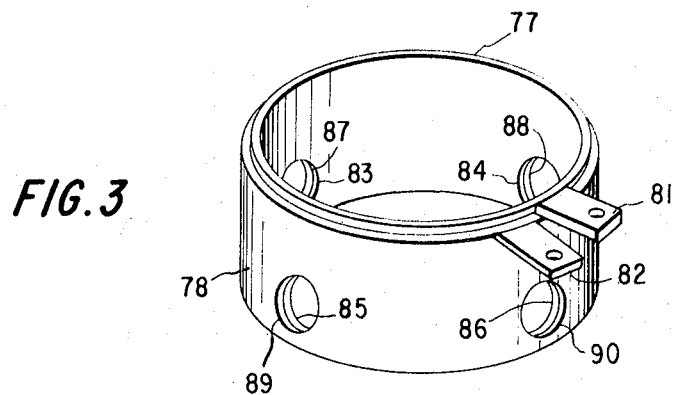
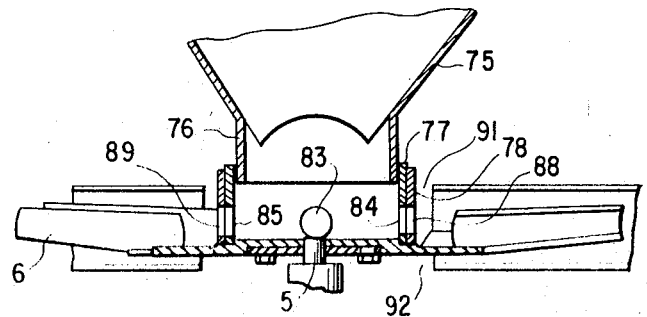

DEVICE FOR SPREADING GRANULAR OR POWDERY MATERIAL

This invention involves a spreading implement of the type used to be traveled over the ground and to evenly spread granular or powdery material over a wide path. The implement includes a frame and ejecter disc with a unique hood and distributing means including adjustable feeding rings.

This application is an improvement of and related to copending application Ser. No. 538,345 filed Mar. 29, 1966, in that a detachable hood with guides and distributor means is secured to an implement to surround a rotatable spreader. The hood of the present invention has outlets and an internal construction that enables ejected granular or powdery material to be broadly spread over the ground and blown through crop as desired.

It is an object of the present invention to provide a spreader implement with which complete coverage of ground and/or crop is achieved by providing air inlets and guide members so that a rotating spreader disc blows as well as ejects the material being dispensed through spaced apart outlets in the hood.

These and other objects will appear from the following description in which:

FIG. 2 is a rear view of the outlets of one portion of the spreading hood shown in FIG. 1;

FIG. 3 is on an enlarged scale a view of the distributor rings positioned between the hopper of the device and the spreading member; and FIG. 4 is a side elevation of a section of the lower part of the hopper and the spreading member showing the distributor rings and air inlets.

Figure 1:
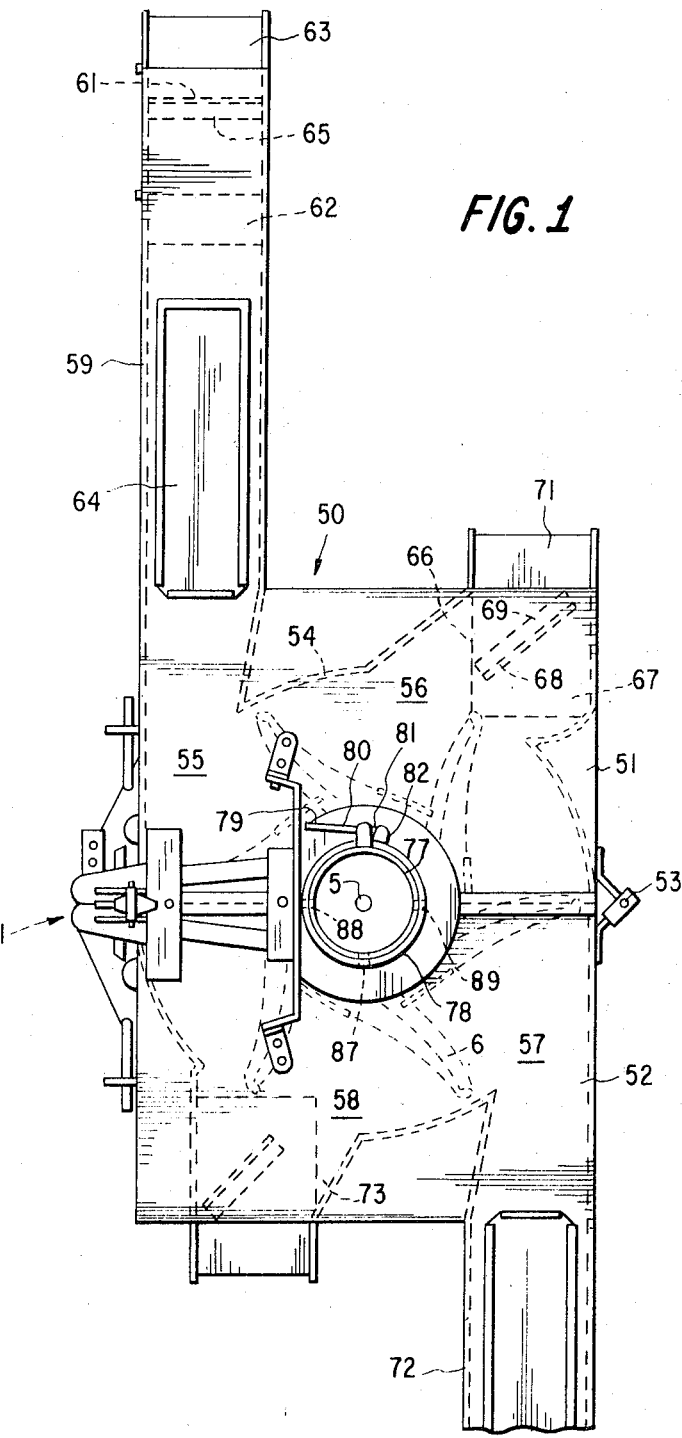
FIG. 1 is a plan view of part of the spreader device and of the spreading hood attached thereto.

As shown in the drawings, a spreading hood 50, which can be square in configuration, is connected to the frame 1 of the device. The spreading hood 50 consists of two portions 51 and 52 that join each other along a vertical plane going through the rotary axis 5 of the spreading member 6 and extending in the direction of travel. The portions 51 and 52 are adapted to pivot relative to each other about a vertical shaft 53. The spreading hood is provided internally with a plurality of substantially equal-sized guide segments 54 which surround the outer circumference of the spreading member 6 and web the top and bottom of the hood. The segments are curved to be equally distanced from axis 5 and separated from one another by four openings 55, 56, 57 and 58 so that these openings are divided from each other over about 90° relative to the axis 5, each by a segment 54. The openings 55 and 56 are located in the portion 51 and the openings 57 and 58 are located in the portion 52.

The portion 51 has an elongated distributing channel or arm 59 which connects with its foremost end to the opening 55 and the inner wall of arm 59 is slanted to restrict the opening entrance somewhat. The outer end of the distributing arm 59 has an outlet 60 at its lower side. Above the outlet 60, the distributing arm 59 has a baffle 61 against which the material is diverted when it is thrown out through the opening 55. The baffle 61 has at its lower end an inwardly directed portion 65. Adjacent the mouth of outlet 60, guide blades 62 and 63 (similar to blades 32 and 33 of FIG. 4 in application Ser. No. 538,345) are positioned to direct ejected material out of outlet 60.

The portion 51 has further a distributing channel or arm 66 which adjoins opening 56. The distributing arm 66 is much shorter than arm 59 and has at its lower end an outlet 67 with a baffle member 68, the lower end of which also has an outwardly bowed portion 69 to direct ejected material. The opening 67 has guide blades 70 and 71 at its lower end for further controlling ejected material.

To enable checking the channel of the distributing arm 59, the upper portion of this distributing arm is provided with an opening which, for normal use of the device, is closed by a slideable closing member 64. The portion 52 of the spreading hood 50 has a distributing channel or arm 72 which is formed with a baffle, guides and an outlet in the same way as the distributing arm 59. The distributing arm 72 adjoins the opening 57 in the circular rim formed by segments 54. The portion 52 has further a distributing channel or arm 73 which is structurally the same as the distributing arm 66. The distributing arm 73 adjoins opening 58 leading to a fourth outlet in arm 73.

The spreading device has a hopper or container 75, the lower end of which terminates in a cylindrical outlet 76. The cylindrical outlet 76 is surrounded by the upper end of distributing means including an inner feed ring 77. Around the inner feed ring 77, there is an outer feed ring 78 and each of the rings 77 and 78 abuts with its lower end on the disc portion of the spreading member 6. The feed rings are held in their relative positions by setting means which can be the same as that disclosed in U.S. Pat. Nos. 3,273,898 or 3,387,792 and have rods 79 and 80 which are connected to lips 81 and 82.

Each of the feed rings 77 and 78 has four outlet ports, the inner feed ring 77 having outlet ports 83, 84, 85 and 86. The outer feed ring 78 has four outlet ports 87, 88, 89 and 90. Each of the outlet ports 83 to 90 is preferably of similar circular form so that each of the outlet ports in the feed ring 77 corresponds with an outlet opening in the feed ring 78. The outlet ports in the respective rings are shown positioned relative to one another so that they are divided from one another over 90° around the axis 5.

The quantity and direction of material which is delivered through the outlet openings per unit of time can be regulated by turning the outer feed ring 78 relative to the feed ring 77. Then the ports in the ring 78 will correspond more or less with the respective outlet ports in the ring 77 and the effective exit for material will be changed. The hood openings 55 to 58 and the outlet ports in the rings 77 and 78 each are divided from one another around the axis 5 over about 90°. As a result of this arrangement, the material delivered out of the container to the spreading member 6 through the outlet port 85 and the corresponding port 89 of ring 78 will leave the spreading member at its circumference near opening 58, for instance, and then be propelled through the distributing arm 73 to its corresponding outlet.

Also, the material delivered out of the hopper to the spreading member 6 through the opening 83 and the corresponding opening 87 will leave the distributing member 6 near the opening 55 adjacent a segment 54 so that this material will be thrown out through the elongated distributing arm 59 and further to the outlet 60. With this arrangement, each of the outlet ports in the rings will feed a distributing arm of the spreading hood 50.

To ensure that the material delivered from the container through the different outlet openings in the feed rings is reaching the openings 55 to 58 in an effective way, the feed rings 77 and 78 can be turned together to some extent around the axis 5 by the above-mentioned setting mechanism, the setting mechanism being constructed in such a way that the feed rings 77 and 78 can be selectively fixed individually and together in different positions around the axis 5.

As seen in FIG. 4, the top and bottom of hood 50, in each portion 51 and 52, has air inlet means in the form of circular apertures 91 and 92 adjacent the outer ring 78 at the top and below the juncture of rings 77 and 78 with the disc portion of spreader member 6. When the member 6 is rapidly rotated, air is drawn in through the air inlet means and propelled through openings 55–58 to assist in moving the material ejected by the blades of member 6.

In FIG. 1, the entrance to opening 55 is narrowed by the inner wall of the arm 59 being slanted outwardly so that the cross section of the arm 59 becomes enlarged towards outlet 60. Arm 72 is constructed the same way with respect to opening 57. Since arms 59 and 72 are elongated relative to arms 66 and 73, the material being dispensed through the former needs an auxiliary force to propel it towards the outlets and this is achieved by the scavenging and ram effect when air is circulated through the "necked down" entrances of the openings of the elongated arms.

What is claimed is:

1. A device for spreading granular or powdery material comprising a hopper for said material, a spreading member rotatable about a substantially vertical axis positioned beneath said hopper, distributing means located between said spreading member and said hopper for passing material from the latter to said member, a hood surrounding at least part of said spreading member and having channeled arms extending outwardly from said spreading member to direct material ejected by said member, said hood including a relatively long arm and a relatively short arm extending transverse to the direction of travel on each side of said hood, said arms each having an opening and an outlet for dispensing material on the ground, said openings being substantially spaced apart from one another on each side of said hood whereby said outlets are positioned to dispense ejected material over a wide path on opposite sides of said device.

2. A device according to claim 1, wherein said hood has internal guide rim segments surrounding said spreader member and said openings are spaced from one another around said axis of rotation at four spaced apart locations, said hood having distributing arms each with an opening leading to said outlet.

3. A device according to claim 2, wherein said segments are curved and spaced apart from one another and said openings are separated from one another by said segments.

4. A device according to claim 3, wherein said segments are of substantially equal size and curved to be equally distant from the axis of rotation of said spreader member.

5. A device according to claim 2, wherein there is air inlet means in said hood adjacent said spreader disc.

6. A device according to claim 5, wherein said air inlet means includes apertures in the top and bottom of said hood.

7. A device according to claim 1, wherein each elongated arm has an inspection opening and a slideable closure for covering same.

8. A device according to claim 2, wherein said arms have baffle means positioned adjacent their respective outlets.

9. A device according to claim 8, wherein each outlet is located below a baffle.

10. A device according to claim 9, wherein guide plates extend downwardly from each outlet.

11. A device according to claim 2, wherein said distributing means is comprised of at least one turnable feed ring and said ring has outlet ports adjustably positioned relative to said openings.

12. A device according to claim 11, wherein there are two turnable feed rings, one inside the other, each ring having outlet ports, said feed rings being turnable relative to said openings and to one another to regulate the direction and quantity of material passed to said spreading member.

13. A device according to claim 12, wherein said outlet ports are circular and said rings are each provided with a tab for turning same whereby the ports of one ring can be more or less placed in register with the other ring.

14. A device according to claim 12, wherein said hopper includes a generally cylindrical outlet which leads within said inner ring.

15. A device according to claim 14, wherein said spreader member is a disc with blades and the bottom edges of said rings abut said disc.

16. A device according to claim 15, wherein air inlet apertures are provided in said hood adjacent the juncture of said rings and said disc.

17. A device according to claim 1, wherein two of said arms are elongated and the openings to said elongated arms are restricted by the inner side walls of said elongated arms, said walls being slanted outwardly towards said openings whereby the cross section of said arms is enlarged beyond said openings.

18. A device for spreading granular or powdery material comprising a hopper for said material, a spreading member rotatable about a substantially vertical axis positioned beneath said hopper, distributing means located between said spreading member and said hopper for passing material from the latter to said member, a hood surrounding at least part of said spreading member and having channeled arms, said hood being generally square-shaped and being comprised of two interconnected similar portions, each of said portions having two spaced apart openings, one for each corner, said portions each having a relatively long arm and a relatively short arm extending transverse to the direction of travel, each arm having an opening at one end and terminating in an outlet with baffle means to direct material ejected from said outlet, said openings being spaced apart from one another around the axis of rotation of said spreading member.

19. A device for spreading granular or powdery material comprising a hopper for said material, a spreading member rotatable about a substantially vertical axis positioned beneath said hopper, distributing means located between said spreading member and said hopper for passing material from the latter to said member, a hood surrounding at least part of said spreading member and having four spaced apart channeled arms extending outwardly, transverse to the direction of travel, each of said arms having openings which are separated from one another by guide segments within said hood, said distributing means having four ports spaced apart about 90° from one another around the axis of rotation of said spreading member, whereby each port is positionable adjacent one of said openings, said arms including one relatively long arm and one relatively short arm on each side of said hood with the short arms and the long arms being arranged diagonally opposite one another about the axis of rotation of said spreading member to receive material through said openings.

* * * * *